United States Patent [19]

Givens

[11] E Patent Number: Re. 32,560

[45] Reissued Date of Patent: Dec. 15, 1987

[54] STABILIZED SURVIVAL RAFT

[76] Inventor: James A. Givens, 19 Willow St., Newport, R.I. 02840

[21] Appl. No.: 284,200

[22] Filed: Jul. 17, 1981

Related U.S. Patent Documents

Reissue of:

[64] Patent No.: 4,001,905
Issued: Jan. 11, 1977
Appl. No.: 573,914
Filed: May 2, 1975

U.S. Applications:

[63] Continuation of Ser. No. 863,873, Dec. 23, 1977, abandoned, and a continuation-in-part of Ser. No. 314,389, Dec. 12, 1972, Pat. No. 3,883,913, which is a continuation-in-part of Ser. No. 216,990, Jan. 11, 1972, abandoned.

[51] Int. Cl.[4] ..... B63C 9/04

[52] U.S. Cl. ..... 441/37; 114/125; 441/38; 441/39; 441/40

[58] Field of Search ..... 114/125; 244/148; 160/DIG. 8, 180; 137/512.1, 512.2; 441/37, 38, 39, 40; 135/93, 117

[56] References Cited

U.S. PATENT DOCUMENTS

| | | | |
|---|---|---|---|
| 627,979 | 4/1899 | Carley | 441/43 |
| 676,836 | 6/1901 | Brown | 441/86 |
| 946,174 | 1/1910 | Vroman et al. | 441/26 |
| 1,712,167 | 5/1929 | Pontikis | 114/348 |
| 1,886,522 | 11/1932 | Buck | 441/37 |
| 2,384,721 | 9/1945 | Bingham, Jr. | 244/142 |
| 2,399,494 | 4/1946 | Manson et al. | 441/37 |
| 2,683,269 | 7/1954 | Harkins | 114/125 |
| 2,858,790 | 11/1958 | Russell, Jr. | 114/121 |
| 2,908,919 | 10/1959 | Bicknell | 441/38 |
| 2,928,108 | 3/1960 | Cochrane et al. | 114/345 |
| 3,037,218 | 6/1962 | Brooks, III | 441/38 |
| 3,058,127 | 10/1962 | Hassold | 441/38 |
| 3,060,465 | 10/1962 | Carstensen | 441/87 |
| 3,092,854 | 6/1963 | Manhart | 441/38 |
| 3,371,640 | 3/1968 | Tsokalas | 114/121 |
| 3,378,029 | 4/1968 | Lee | 137/512.2 X |
| 3,703,268 | 11/1972 | Pravaz | 244/148 |
| 3,736,607 | 6/1973 | Radnofsky et al. | 114/122 |
| 3,736,608 | 6/1973 | Whitehead | 114/125 |
| 3,870,006 | 3/1975 | Hashimoto | 114/121 |
| 4,054,961 | 10/1977 | Tangen | 441/39 |

FOREIGN PATENT DOCUMENTS

| | | |
|---|---|---|
| 39357 | 10/1928 | Denmark . |
| 1208254 | 2/1960 | France . |
| 7015782 | 3/1972 | France . |
| 2380 | 5/1953 | Japan . |
| 18476 | 12/1974 | Japan . |
| 6092 | 1/1975 | Japan . |
| 15145 | of 1913 | United Kingdom . |
| 835061 | 5/1960 | United Kingdom . |

*Primary Examiner*—Sherman D. Basinger
*Attorney, Agent, or Firm*—Burns, Doane, Swecker & Mathis

[57] ABSTRACT

A stabilized life raft utilizing a fluid filled depending buoy chamber for overall stabilization and including as improved features thereon a peripheral skirt chamber which fills with the raft supporting fluid upon deployment of the raft and serves as a temporary stabilizer while the buoy chamber becomes filled. The buoy chamber includes baffles to impede the flow of the stabilizing fluid from one portion of the chamber to another in the event of a sudden weight shift within the raft. An improved valve permits a more rapid inward flow of fluid upon deployment of the raft and yet prevents outward flow in instances where the buoyant raft is suddenly thrust upwardly by elements such as waves. The raft, because of the particular placement of the various structural elements in conjunction with the placement of the survival gear and inflation system, is automatically self-righting.

12 Claims, 5 Drawing Figures

Fig. 1
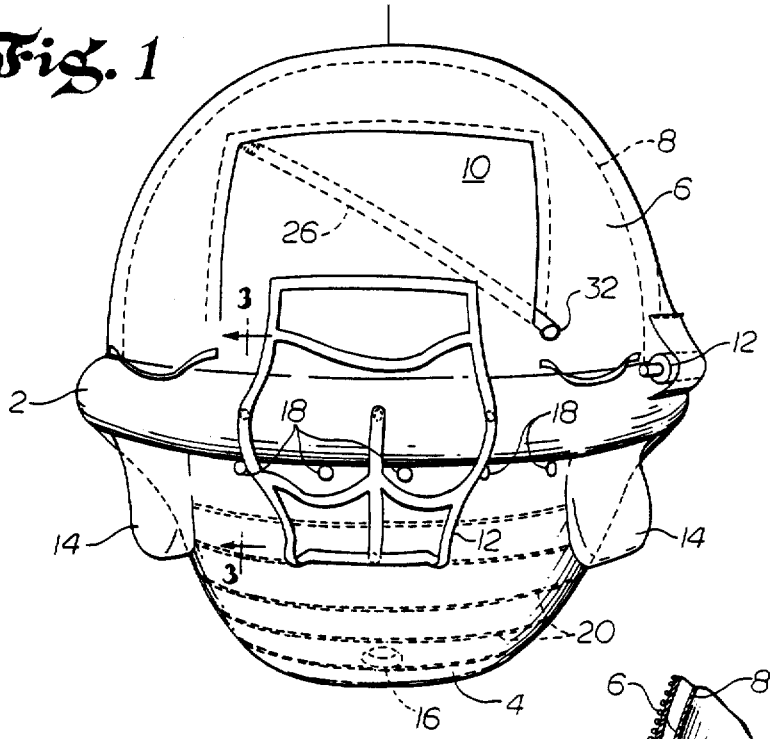
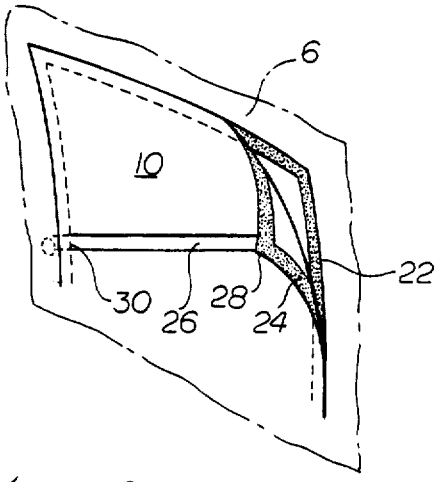
Fig. 2
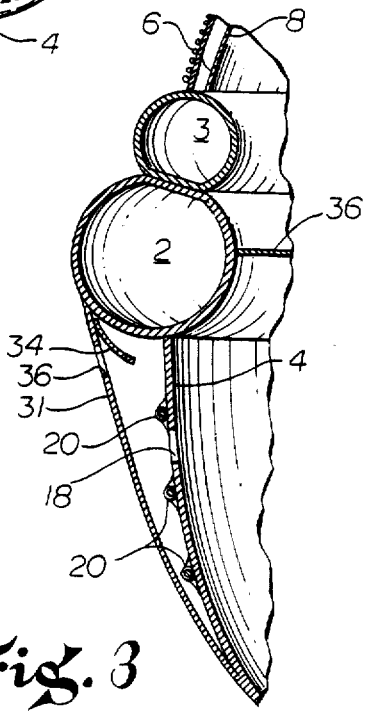
Fig. 3

STABILIZED SURVIVAL RAFT

Matter enclosed in heavy brackets [ ] appears in the original patent but forms no part of this reissue specification; matter printed in italics indicates the additions made by reissue.

BACKGROUND OF THE INVENTION

This is a continuation of Ser. No. 863,873 filed Dec. 23, 1977 and now abandoned.

*This application is a continuation-in-part of U.S. patent application Ser. No.* 314,389, filed Dec. 12, 1972, U.S. Pat. No. 3,883,913 which is a continuation-in-part of U.S. patent application Ser. No. 216,990, filed Jan. 11, 1972, and now abandoned.

The prior art in the inflatable life saving equipment field is well known to the present inventor and is believed to be fully disclosed and described in the above U.S. Pat. The disclosure with respect to the basic stabilized raft unit, as well as the prior art as disclosed by the inventor and that discovered by the Examiner are incorporated herewith by reference. It is the applicant's position that the prior art as noted hereinabove does not anticipate the basic invention and further that there is nothing in the art presently known to the inventor which would anticipate the present improvements.

As has been noted in the above reference patent, one of the difficulties with inflatable life rafts has been the fact that since they are, of necessity, light of weight and are inflated with a gaseous substance, they are extremely subject to being blown away by high winds. Since the construction of the heretofore accepted raft also results in a high center of gravity, the rafts are easily overturned in high seas by sudden shifts within the raft. The basic stabilized raft, as described in the above referenced patent, eliminates these problems by utilizing the supporting fluid as a stabilizing and weighted keel integrating such fluid into the structure of the raft.

Although the stabilized and weighted keel as described in the above referenced patent substantially solves the major problems and detractions of the heretofore accepted inflatable life raft there has proven to be, through testing and utilization of the stabilized raft of, areas of improvement, which when seriously considered and attacked, in a positive manner have rendered the raft as described herein of even superior stability and safety.

One of the problems noted during the testing of the basic stabilized raft is in the amount of time, short though it may be, that it takes for the buoy chamber to fill with the supporting fluid. During this filling time, the raft, because of its basic nature, continues to have some of the instability it was designed to correct. With the above noted problem in mind it is an object of the present invention to provide a valve structure in the base of the stabilizing chamber which will allow the chamber to be filled far more rapidly and readily and yet prevent a rapid outflow of fluid such as could be caused under certain specific conditions when the raft is suddenly lifted by a wave.

Yet another problem of currently available life rafts is in the fact that a sudden shifting of weight within the raft when combined with an inopportune wind direction or wave action may cause the raft to flip over. It has been noted that even in a stabilized raft as described in the above-noted patent, a sudden shifting of material within the raft can at least cause the feeling of instability.

It is therefore an object of the present invention to greatly improve the stability of a life raft which contains a fluid filled buoy by placing within the buoy chamber itself a plurality of baffles or other deterents to the rapid flow of water which have included therewith a number of openings permitting the equalization of the fluid within the chamber and yet preventing rapid movement of fluids in the chamber from one section to another. This increased stability counteracts a rapid shift of weight in the main portion of the raft.

Still another disadvantage of presently available rafts is apparent in the entrance way to those rafts which include enclosures to protect the occupants from the weather. The entry ways have been traditionally secured by a covering door held in position by zippers. During a heavy sea or high wind, it is extremely difficult for a fatigued person to stabilize themselves upon a rapidly bobbing raft while attempting to open the door by means of unzipping a zipper.

With the above problem in mind it is an object of the present invention to provide a door to the enclosed survival chamber which is capable of rapid and simple opening and does not require intricate finger manipulation. The seal between the canopy bubble and the door itself is formed by means of Velcro fasteners which extend around the inner periphery of the door opening and the exterior periphery of the door. An opening strap is provided which extends from one of the upper inner corners of the door, downwardly, interior of the raft and then outwardly to terminate in a hand grip exterior of the raft. When the person desires to gain entrance to the raft a rapid yank upon the strap will release the top component of the door. Because of the arcuate shape of the canopy the door will simply roll downwardly away from the framework upon continuous pulling of the strap, exposing the entry way.

Yet another problem that has lessened the value of heretofore acceptable inflatable rafts at sea and thus inhibited their use has been the fact that quite often they would inflate in an upside-down position. When this happens, particularly in heavy seas, it is virtually impossible to either right the raft or to maintain oneself on the top of the overturned raft. Needless to say the survival gear required is secured on the interior or topside of the raft and thus unaccessible when the raft is overturned.

With this problem in mind it is still another object of the present invention to combine the proper placement of the survival and inflation gear of the raft in conjunction with the buoyant tubes themselves including the inflatable strut members which support the canopy such that the raft, when inflated will automatically be self-righting under most conditions.

BRIEF DESCRIPTION OF DRAWINGS

FIG. 1 is an environmental view of the stabilized raft, of which the present improvements are a part.

FIG. 2 is an enlarged view of the novel doorway closure as viewed from the interior of the raft.

FIG. 3 is a sectional view taken along lines 3—3 of FIG. 1 and showing an alternate improved stabilizing means utilizing a peripheral skirt.

DETAILED DESCRIPTION OF DRAWINGS

Figure 4:
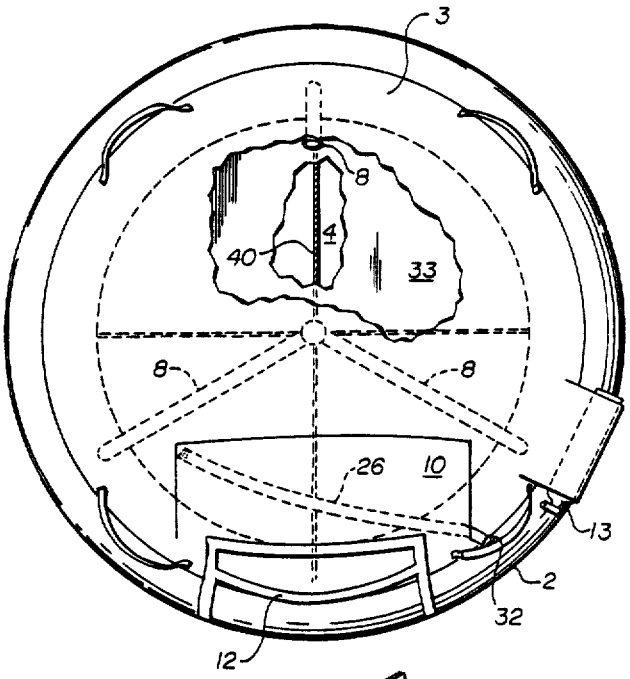
FIG. 4 is a plan view of the raft partially broken away showing the placement of the inflation system as well as the baffles located in the interior of the buoy chamber.

As seen in FIG. 1 an illustrative life saving raft is shown and includes as a basic portion thereof the buoyant raft supporting peripheral inflatable [member 2 below which] *flotation structure or buoyant platform 2, the interior of which is spanned by a floor 36 (FIG. 3) capable of supporting at least one human body. Beneath the structure 2* is suspended the buoy *or main stabilizing* chamber 4 and above which is placed the canopy 6 which is supported by inflated truss members 8. A door 10 and ladder 12 permit access to the raft for persons seeking safety and protection from the elements. A bottle 13 containing compressed air is secured to the side of the raft and is activated either manually or by water pressure if the raft sinks beneath a predetermined depth in a manner well known in the prior art. Also, as seen in this figure are a plurality of stabilizing water bags 14 which serve as aids in stabilization during the filling of the buoy chamber 4.

The buoy chamber 4 is, as to be explained hereinafter, filled through a bottom opening 16 and a plurality of side ports 18 which serve to both admit fluid and also to provide an escape for any gaseous substance entrapped within the buoy itself. *The buoy chamber 4 is designed to be filled with water to form a depending pendulous structure when the device is in use.* A plurality of cable elements or closed loops 20 are sewn into the buoy compartment and extend around the periphery of the buoy chamber as will be described in greater detail hereinafter.

Referring now to FIG. 2, the door 10 which provides access to the raft must, by regulation, be capable of opening inwardly of the protective canopy. It is imperative that it be able to open inwardly such that people within the raft have a means to exit if necessary even when there is great exterior pressure against the entry way but it also must be able to withstand the force of wind and waves in heavy seas so that the interior of the raft remains secure. The door 10 of the present invention is secured to the wall of the canopy 6 by means of Velcro fasteners 22 and 24 which are secured respectively to the canopy and around the periphery of the door. When the edges are placed in contact, the complementary fasteners interlock and retain the door in position against the intrusion of waves and weather. Since the door must also be capable of being opened from the exterior of the raft, the door being in a closed position when the raft is packed, a strap 26 is provided which extends from the upper corner 28 of the door 10 diagonally across the door and exits through a slot 30 to terminate in a handle means 32 (see FIG. 1). When an individual desires access to the interior of the canopy, he grabs the handle 32 and yanks outwardly of the raft, causing the strap 26 to disengage the corner 28 of the door 10. Continued pulling of the strap 26 causes the door to curl away from the Velcro securement quickly and easily exposing the entire opening allowing easy access to the interior of the canopy without the necessity of difficult digital manipulation.

Referring now to FIG. 3, an alternative method of providing stabilization during the early stages of deployment is shown. As envisioned in this particular embodiment, the main support tube 2 has secured thereto a secondary support tube 3 which has extending upwardly therefrom an inflatable strut 8 which, as noted above, supports the canopy 6. As further seen in this figure, the buoy element 4 which is secured to the support tube 2 or other portion of the bottom of the raft has sewn therein a plurality of cable or other similar members 20 which have some degree of memory such that when the raft is in the inflated condition form closed loops giving some substance to the sidewalls of the buoy chamber. The members 20, when packed for storage or carrying are in a coiled, compact form. A port 18 one of many about the upper periphery of the chamber which permits water to the interior of the buoy or allow gases trapped within the buoy during the filling thereof to escape, is also shown.

Exterior of the buoy wall 4 is a peripheral skirt [32] *or second sheet member 31* which extends from the outer edge of the inflatable tube 2 to a line of interconnection part way down the skirt *or first sheet member that forms the buoy wall.* As the raft is deployed and the tube 2 inflates, providing an upward buoyant force, counteracting the downward force generated by the plurality of cables 20 and the other material and gear, the skirt [32] *or sheet member 31* is forced outwardly from the wall 4 creating a partial vacuum condition between the wall 4 and the [wall 32] *sheet member 31.* The partial vacuum condition rapidly draws fluid into the lower portion of the skirt, i.e. below *the* opening 18, providing a temporary stabilizing medium extending around the entire periphery of the raft, *i.e. a peripheral trough.* A one-way valve or flap 34 is provided on the interior of hole [35] *36* which extends through the upper portion of the wall of skirt [32] *or sheet member 31* such that rapid shifting of weight such as occurs during boarding or the like will not cause the water within the peripheral chamber to flow outwardly thereof, the valve preventing such flow.

Referring now to FIG. 4, which is a plan view, the relative location of the inflation bottle can be seen. As seen in this way the bottle is located adjacent the end of one of the inflatable struts and it is when located thus, that it reacts with the inflatable portions, causing the raft to be self-righting. As will be recognized, it is imperative that the raft inflate in the proper right side up orientation since if the canopy were to fill with water, the raft would be difficult, if not impossible, to right. The proper location of the inflating medium with respect to the inflatable portions, thus predetermining the portion which is initially buoyant, controls the orientation upon inflation. It is to be understood that the proper placement of the other survival material within the raft will definitely affect the orientation of the collapsed raft when in the water and so will assist in the self-righting aspect. Also to be seen in this view is the doorway 10, the strap handle 32, the placement of the struts 8, shown in phantom, and also the relative placement of a baffle system including vertical elements 40 mounted within the buoy chamber itself.

Figure 5:
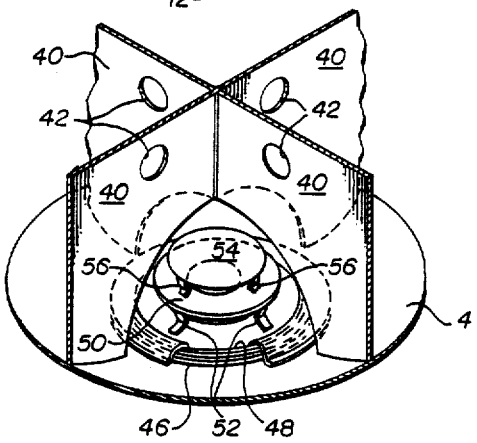
FIG. 5 is an enlarged view of the bottom portion of the buoy chamber showing the placement of the baffle members as well as an improved one-way valve structure.

Attention is now directed to FIG. 5 wherein the preferred baffle elements 40 can be seen extending upwardly from the bottom portion of the buoy chamber defined by the wall 4. It is to be noted that the baffle elements 40 include a plurality of ports 42 which permit a controlled flow of liquid from one baffle chamber to the other and yet restrict the flow such that a rapid movement of weight within the raft will not cause a similar flow of fluid within the baffle chamber. It is to be noted that into the very bottom most portion of the wall 4 which defines the buoy chamber there are sewn within the wall 4 a plurality of circular cable elements 46 which serve to urge the buoy wall to its extended position also to define the periphery of the main filling opening 48.

When deployed, the majority of the fluid which fills the chamber defined by the wall 4 enters through the opening 48. As stated hereinabove, it is desirable to have the fluid remain within the chamber during a rapid upward movement of the raft itself. The opening therefore must be fitted with a valve which permits rapid inflow of fluid and yet prevents outward flow of fluid. As shown in FIG. 5, this control is provided by a multipiece valve, which has a main body portion 50 secured to the edges of the opening 48 by a plurality of straps 52. Straps 52 permit upward movement of the valve and yet downward movement is limited and controlled. When portion 50 is in its downward position it will overly and thus close the opening 48. Since the main body 50 of the valve would likewise restrict inward flow as shown in this view a second stage identical to the first stage having a main body 54 and straps 56 is shown. It is to be understood that if a two stage valve does not prove effective in permitting the water to rapidly fill the chamber then a three stage or four stage valve of similar construction is contemplated. The addition of stages permits inward flow but in the manner described hereinabove, automatically prevents outward flow.

Thus, as can be seen, the raft which incorporates the buoy chamber in conjunction with the one-way valve, the self-righting feature and the control of flow within the chamber itself offers substantially more stability and thus safety, than has heretofore been available. It is to be noted also that the door which is closed by a Velcro fastener as described herein provides substantial advantage over the zipper doors which are presently available.

What is claimed is:

1. A greatly improved device for assisting in the saving of lives at sea including a platform capable of supporting humans, said platform maintained in a stable upright floating condition by a buoyant peripheral flotation structure and [an attached main stabilizing chamber extending around the periphery of the flotation structure,] *a substantially closed, pendulous main stablizing chamber secured to the flotation structure* said chamber designed to be filled with the supporting fluid when the device is in use, the improvement comprising:

a. [a circumferential] sheet means secured to the buoyant peripheral flotation structure at a point spaced from the attachment of the *main* stabilizing chamber and extending downwardly therefrom, said sheet *means* being secured to the main stabilizing chamber distally from the flotation structure thus forming a peripheral chamber, and b. openings in the wall of the [circumferential] sheet means whereby the peripheral chamber quickly fills with the supporting fluid and serves as a stabilizer until the main chamber fills with fluid.

2. A stablized life raft having a peripheral, inflatable member supporting a floor spanning the interior [distance] *dimension* of the raft and a stabilizing chamber defined by the floor of the raft and a wall structure spaced from said floor, a peripheral trough surrounding said chamber, said trough filling with the supporting fluid and providing temporary stabilization during the filling of the main chamber, said chamber being filled with the supporting fluid when in use and means separating the stablizing chamber into communicating sections permitting controlled fluid flow between the [chambers] *sections* to assure stability even though the weight in the raft shifts.

3. A device as in claim 1 wherein the stabilizing chamber includes at least one baffle means extending across the chamber to impede the flow of fluid in the event of a rapid shifting of relative position of the device.

4. A device as in claim 3 wherein the baffle means includes a plurality of intersecting flexible elements including openings to permit the restricted flow of fluid therethrough.

5. A device as in claim 1 and further including a plurality of flexible resilient elements sewn within the walls of the chamber, said elements being coiled in a compact configuration when the device is stored and expanding to a large circular loop when the device is in use.

6. A device as in claim 1 and further including a one way valve in the lower portion of the stabilizing chamber.

7. A device as in claim 6 wherein the one way valve comprises a plurality of similar interconnected overlapping valve elements permitting a greater opening for inflow and yet a reliable restriction upon the outflow of fluid.

8. A life saving device for use upon a fluid such as water comprising a buoyant platform of a size and buoyancy to support a human body, said platform including a protective canopy structure to shield an occupant of the platform from the elements, access means to the interior of said canopy by an inwardly opening door, means securing the door to the canopy capable of rapid securement and release and opening means secured to the door, extending from the upper corner of the door interior of the canopy to the exterior of the canopy adjacent the lower edge of the door whereby the door may be opened by a person in the water by a single tug upon the opening means whereby a person suffering from exposure and having lost control of small muscles is still able to gain entrance to the canopy.

9. A life saving device as in claim 2 wherein the stabilizing chamber includes a multi-sectional one-way valve to control the fluid flow.

*10. A greatly improved device for assisting in the saving of lives at sea, including a platform capable of supporting humans, said platform maintained in a stable, upright floating condition by a buoyant peripheral flotation structure, and a substantially closed main stabilizing chamber secured to the flotation structure, said chamber defined by a bottom of the platform and a first sheet means depending therefrom, said sheet means including openings to permit entry of the supporting fluid, said chamber designed to be filled with the supporting fluid when the device is in use, the improvement comprising:*

*second sheet means secured to the buoyant peripheral flotation structure at a point spaced from the attachment of the main stabilizing chamber and extending downwardly therefrom, said second sheet means being secured to the main stabilizing chamber distally from the flotation structure thus defining a peripheral chamber, at least one opening in the wall of the second sheet means and between the peripheral chamber and the main chamber whereby the peripheral chamber quickly fills with the supporting fluid and serves as a stabilizer until the main chamber fills with fluid.*

*11. A stablized life raft having a peripheral, inflatable member supporting a floor spanning the interior dimension of the raft and a main stabilizing chamber defined by the floor of the raft and a wall structure below said floor, a peripheral trough surrounding said chamber and in fluid communication therewith, said trough filled with the supporting fluid and providing temporary stabilization during the filling of the main chamber, said chamber being filled with the supporting fluid when in use, and means separating the stabilizing chamber into communicating sections and permitting controlled fluid flow between the sections to assure stability even though the weight in the raft shifts.*

*12. A device for assisting in the saving of lives in a body of water such as the ocean, comprising:*

*a platform capable of supporting humans, said platform supported by a buoyant peripheral flotation structure;*

*a main stabilizing chamber secured to the flotation structure, said chamber defined by the bottom of the platform and a first sheet means depending from the peripheral flotation structure and having at least one opening therein through which water passes from the body of water into the main stabilization chamber, said chamber being designed to be filled with water to form a depending pendulous structure when the device is in use; and*

*a second sheet means secured to the buoyant peripheral flotation structure at a point spaced from the attachment of the main stabilizing chamber and extending downwardly therefrom, said second sheet means being interconnected to the main stabilizing chamber distally from the flotation structure thus defining a peripheral chamber, said second sheet means having at least one opening to permit fluid flow through said second sheet means, and said first sheet means having at least one opening to permit fluid flow between the peripheral chamber and the main chamber;*

*whereby the peripheral chamber fills quickly with water when the flotation structure inflates.*

* * * * *